June 12, 1956  J. O. EAMES ET AL  2,749,978
TWIN PARKING METER
Filed Sept. 1, 1953  3 Sheets-Sheet 3
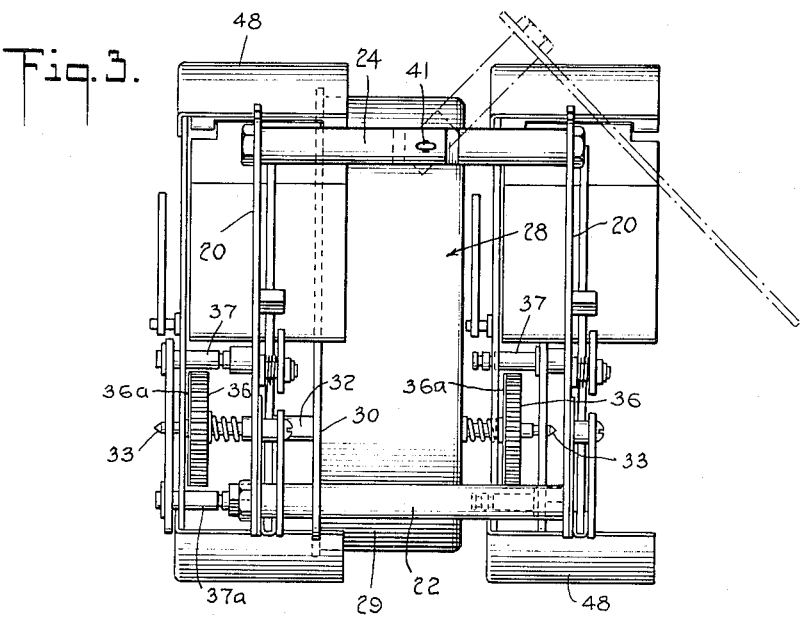
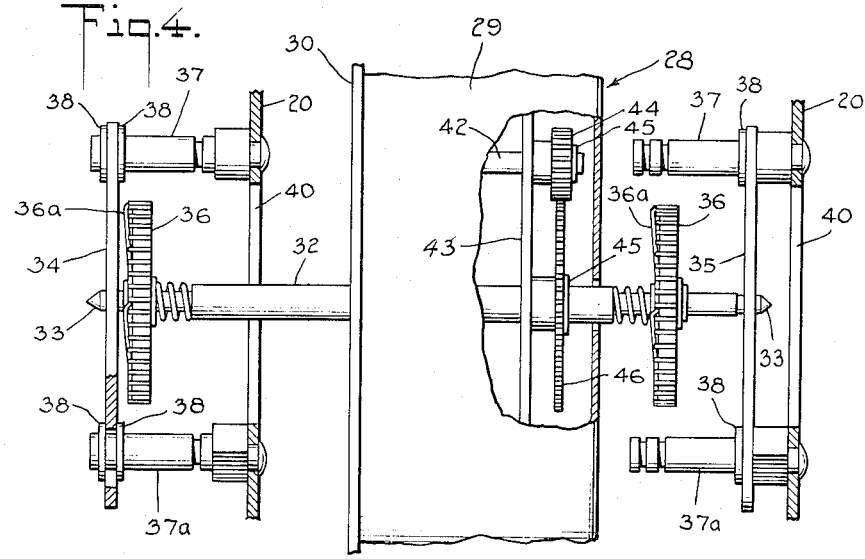
INVENTORS
JAMES O. EAMES &
BY ROY S. SANFORD
Burgess, Ryan & Hicks
ATTORNEYS

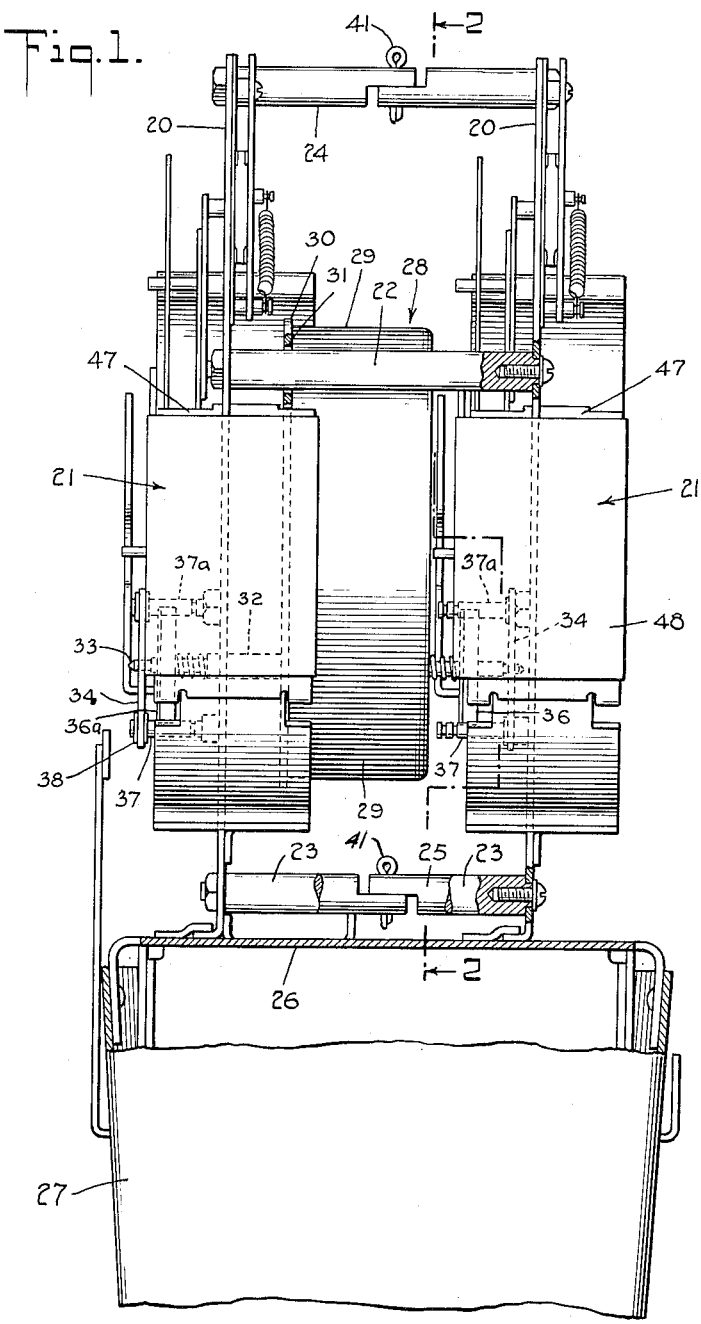

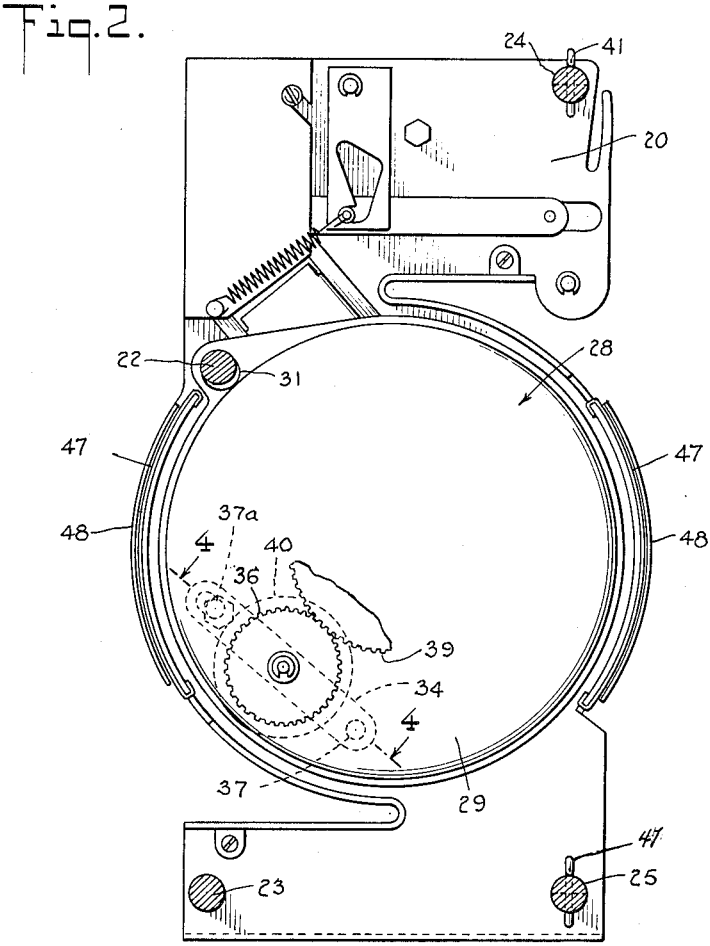
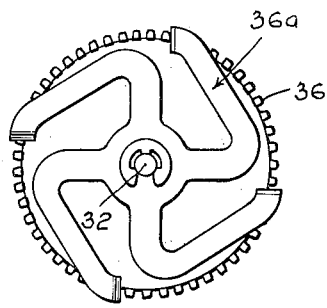

2,749,978

TWIN PARKING METER

James O. Eames, Washington, and Roy S. Sanford, Woodbury, Conn., assignors to The Michaels Art Bronze Company, Incorporated, Covington, Ky., a corporation of Kentucky Application September 1, 1953, Serial No. 377,790

10 Claims. (Cl. 161—15)

The present invention relates to parking meters and more particularly to a twin parking meter.

An object of the present invention is to provide a construction of a twin parking meter which permits both sides of the meter to be identical, thereby saving cost in assembly procedures and inventories. Another object of the invention is to provide a construction of a twin meter which permits repairs or replacements to be made without difficulty.

Other objects and advantages of the invention will be apparent and best understood from the following description and the accompanying drawings in which:

Fig. 1 is an end view in partial section of parking meter embodying the present invention;

Fig. 2 is a section view taken along the line 2—2 of Fig. 1;

Fig. 3 is a top view of the parking meter illustrated in Fig. 1;

Fig. 4 is a fragmentary view in partial section of the parking meter illustrated in Fig. 3, but on an enlarged scale; and Fig. 5 is a side view of a part of the meter mechanism on an enlarged scale.

Referring to the drawings in detail, there are two chassis plates 20 on each of which a meter mechanism, indicated generally at 21 is mounted. The meter mechanisms are identical and are more fully described and claimed in our copending application for United States Letters Patent Serial No. 377,933, filed concurrently herewith, to which reference may be made.

As shown in Fig. 1, the chassis plates 20 are secured in spaced relation to each other by tie bolts 22 and 23 at the front thereof and hinged tie bolts 24 and 25 at the rear thereof. The chassis plates 20 are supported on a suitable platform 26 forming a part of a base 27 of a meter housing (not shown) and extend upwardly therefrom.

A clock or timer 28 is located between the two chassis plates and is enclosed in a case 29 which is mounted on a clock plate 30. The clock plate 30 has a slotted opening 31 therein through which the tie bolt 22 extends to prevent rotation of the clock. The clock has an output shaft 32, see Fig. 4, which extends on both sides of the case and trunnions 33 at the ends of the output shaft are journalled in bearing members or bridge plates 34 and 35 which are mounted on the respective chassis plates. A gear 36 and a clutch assembly 36a are also carried on the clock output shaft at each end thereof.

As shown in Fig. 4, the bridge plates 34 and 35 are each supported in spaced relation to the respective chassis plates 20 by a stud 37 and an eccentric stud 37a and are held in place by retaining rings 38. The eccentric studs 37a provide an adjustment whereby each of the gears 36 may be brought into proper meshing engagement with gear teeth on a ratchet wheel or meter timing gear 39 in the respective meter mechanisms.

In view of the foregoing, it will be apparent that the clock or timer is supported solely by engagement of the bridge plates with the timer shaft and engagement of the clock plate with the tie bolt 22 which takes the torque of the timer. Individual adjustment of the mesh of each timer shaft gear with the corresponding meter gear on the chassis plate is readily effected by adjustment of eccentric studs 37a. Thus adjustment of the gear mesh is actually effected by bodily movement of the timer relative to the spaced chassis plates, and the slotted opening 31 in the clock plate is so dimensioned with respect to the tie bolt 22 as to permit such bodily movement.

It will be noted that the bridge plates 34 and 35 are supported on the same side of their respective chassis plates, but at different distances therefrom. This arrangement permits the gears 36 on the clock output shaft to be positioned on the same side of and at the same distance from their respective chassis plates. To permit engagement of the shaft with the bridge plate 34, the left hand chassis plate is provided with an opening 40 therein across which the bridge plate thereon extends. The opening 40 is large enough to permit the clutch assembly and gear carried on left end of the clock shaft to pass through it. Since the chassis plate are identical in construction, there is also an opening 40 in the right hand chassis plate, but in this case, the shaft does not pass through this opening. Such an arrangement simplifies the manufacture and assembly of the meters because each half of the meter can be made and assembled in exactly the same way except for the location of the bridge plate and there is no difference between the left-hand and the right-hand meter mechanisms. Under such conditions a stock of meters may be kept on hand and the appropriate bridge plates can be readily applied to the chassis plates as the meter mechanisms are taken from stock for use.

In some instances where one side of the parking meter is to be blanked out and only one meter mechanism is to be used in the parking meter, as at the end of a street, a chassis plate without a meter mechanism assembled thereon may be used on the blank side of the meter.

The rear tie bolts 24 and 25 connecting the chassis plates are in two pieces and are hinged together by cotter pins 41 so that when the front tie bolts 22 and 23 are unscrewed, the chassis plates 20 may be swung apart as indicated by the dot and dash lines in Fig. 3. This enables the clock to be removed readily for repair or replacement and it also permits repairs or changes in the meter mechanisms to be made without difficulty.

As shown in Fig. 4, the clock mechanism 28 has a shaft 42 in the gear train between the clock spring and the escapement. In the embodiment illustrated, the shaft 42 turns at the rate of one revolution in twelve hours. One end of the shaft 42 extends through a clock frame 43 and has a splined section on which a gear 44 is carried and is held in place by a retaining ring 45. The clock output shaft 32 also has a splined section within the case on which a gear 46 is mounted so as to mesh with and be driven by the gear 44 at the timed rate.

This arrangement permits the rotational speed of the clock output shaft to be readily changed by merely removing the clock case and substituting matched pairs of the gears 44 and 46. Such matched gears will have the same diametrical sum or pitch centers but will have varying tooth ratios and by this means the speed of the clock output shaft may be varied from one revolution in four hours to one revolution in forty-eight hours as desired. It will of course be understood that when such changes on the speed of the clock output shaft are made, suitable scale plates 47 will be used on the meters to cooperate with signal flags 48.

It will be understood that various changes and modifications may be made in the embodiment of the invention illustrated and described herein without departing from the scope of the invention as defined by the following claims.

We claim:

1. In a parking meter of a type suitable for controlling two adjacent parking spaces, a pair of chassis plates secured in spaced relation, substantially parallel to each other; each of said plates having an enlarged opening therein; a bearing member supported in spaced relation, substantially parallel to and adjacent the inner side of one of the chassis plates; a second bearing member supported in spaced relation, substantially parallel to and adjacent the outer side of the other chassis plate; said bearing members having portions overlying the enlarged openings in the respective chassis plates; a timing mechanism located between the chassis plates; an output shaft extending from the timing mechanism on both sides thereof; one end of the shaft extending through the opening in one of the chassis plates and being journalled in the bearing member on the outer side of said plate; the other end of the shaft being journalled in the bearing member on the inner side of the other chassis plate; and gears carried by said shaft adjacent its ends; the gear adjacent the end of the shaft extending through the opening in the chassis plate being located on the outer side of said chassis plate and the gear adjacent the other end of the shaft being located on the inner side of the other chassis plate; said gears being located at equal distances from their respective chassis plates.

2. In a twin parking meter, the combination of a pair of chassis plates secured in spaced relation, substantially parallel to each other; each of said chassis plates having an enlarged opening therein; a bearing member supported in spaced relation, substantially parallel to and adjacent the inner side of one of the chassis plates; a second bearing member supported in spaced relation, substantially parallel to and adjacent the outer side of the other chassis plate; said bearing members having portions overlying the enlarged openings in the respective chassis plates; a timer located between the chassis plates; an output shaft extending from the timer on both sides thereof; gears carried by the output shaft adjacent each end thereof; said shaft being journalled at opposite ends thereof in said bearing members with the gear adjacent one end of the shaft being located on the inner side of one of the chassis plates and the gear adjacent the other end of the shaft being located on the outer side of the other chassis plate.

3. In a twin parking meter, the combination as defined in claim 2 wherein the gears adjacent the ends of the timer shaft are located at equal distances from their respective chassis plates.

4. In a twin parking meter, the combination of a pair of chassis plates secured in spaced relation, substantially parallel to each other; each of said chassis plates having an enlarged opening therein; a bearing member supported in spaced relation substantially parallel to and adjacent the inner side of one of the chassis plates; a second bearing member supported in spaced relation substantially parallel to and adjacent the outer side of the other chassis plate; said bearing members having portions overlying the enlarged openings in the respective chassis plates; a timer located between the chassis plates; an output shaft extending from the timer on both sides thereof; said timer including a gear train for driving the output shaft at a timed rate; said gear train including a pair of removable gears for controlling the timed rate at which the output shaft is driven; gears carried by the output shaft adjacent each end thereof; said shaft being journaled at opposite ends thereof in the bearing members with the gear adjacent one end being located on the inner side of one of the chassis plates and the gear adjacent the other end thereof being located on the outside of the other chassis plate.

5. In a twin parking meter, the combination of a pair of substantially identical chassis plates; hinged means for securing said chassis plates in spaced relation, substantially parallel to each other; each of said chassis plates having an enlarged opening therein, a bearing member supported in spaced relation, substantially parallel to and adjacent the inner side of one of the chassis plates; a second bearing member supported in spaced relation, substantially parallel to and adjacent the outer side of the other chassis plate; said bearing members having portions overlying the enlarged openings in the respective chassis plates; a timer located between the chassis plates; an output shaft extending from the timer on both sides thereof; gears carried by the output shaft adjacent each end thereof; said shaft being journalled at opposite ends thereof in said bearing members with the gear adjacent one end thereof being located on the inner side of one of the chassis plates and the gear adjacent the other end thereof being located on the outer side of the other chassis plate.

6. In a parking meter of the type suitable for controlling two adjacent parking spaces, a pair of chassis plates secured in spaced relation, substantially parallel to each other; a bearing member supported in spaced relation substantially parallel to and adjacent the inner side of one of the chassis plates; a second bearing member supported in spaced relation substantially parallel to and adjacent the outer side of the other chassis plate; at least one of said plates having an enlarged opening therein across which the bearing member thereon extends; a timing mechanism located between the chassis plates; an output shaft extending from the timer on both sides thereof; and a gear carried by said shaft adjacent one end thereof; said output shaft being journalled at opposite ends thereof in said bearing members with said one end of the shaft and the gear thereon extending through the enlarged opening in one of the chassis plates.

7. In a twin parking meter, the combination of a pair of chassis plates secured in spaced relation, substantially parallel to each other, parking meter mechanisms assembled on the inner side of one of the chassis plates and on the outer side of the other chassis plate; said chassis plates and meter mechanisms being substantially identical; each of said chassis plates having an enlarged opening therein; a bearing member supported in spaced relation substantially parallel to and adjacent the inner side of the chassis plate having the meter mechanism on said side; a second bearing member supported in spaced relation substantially parallel to the outer side of the other chassis plate; said bearing members having portions overlying the openings in the respective chassis plates; a timer located between the chassis plates for controlling operation of the meter mechanisms on both of the chassis plates; an output shaft extending from opposite sides of the timer; and gears carried by the shaft adjacent each end thereof; said shaft having its ends journaled in the bearing members with the gear adjacent one end thereof being located on the inner side of one chassis plate and the gear adjacent the other end thereof being located on the outer side of the other chassis plate.

8. In a twin parking meter of the type having a pair of meter mechanisms controlled by a common timer mechanism, the combination of a pair of meter chassis plates secured together in spaced relation substantially parallel to each other; a meter timing gear mounted on the inner side of one of the chassis plates; a second meter timing gear mounted on the outer side of the other chassis plate; a timer positioned between the chassis plates; a timer shaft extending outwardly from said timer on both sides thereof toward the chassis plates; timer shaft gears carried by said shaft adjacent each end thereof; said gears being positioned to mesh with the meter timing gear on the respective chassis plates; and means for supporting the timer with the timer shaft gears in mesh with the meter timing gears; said means comprising a bearing mounted on each chassis plate for rotatably supporting the outer ends of said timer shaft; and a connecting member extending between the chassis plates; said connecting member engaging with and holding the timer against bodily rotation about the axis of the timer shaft.

9. In a twin parking meter, the combination as defined in claim 8 wherein the bearings on the chassis plates are adjustable to effect proper meshing between the gears carried by the timer shaft and meter timing gears on the respective chassis plates; and the engagement of the timer with the connecting member permits bodily movement of the timer and timer shaft relative to the chassis plates on movement of said bearings.

10. In a twin parking meter, the combination as defined in claim 8 wherein the chassis plates are pivotally connected together on one side and are movable relative to each other to engage and disengage the bearings on the chassis plates with the outer ends of the timer shaft.

References Cited in the file of this patent

UNITED STATES PATENTS

| | | |
|---|---|---|
| 2,359,754 | Fink | Oct. 10, 1944 |
| 2,628,699 | Sanford et al. | Feb. 17, 1953 |